(No Model.)

G. M. FISKE.
BRICK.

No. 415,774. Patented Nov. 26, 1889.

WITNESSES
J. M. Hartnett.
S. W. Williams

INVENTOR
George M. Fiske,
By his Atty.
Henry W. Williams

UNITED STATES PATENT OFFICE.

GEORGE M. FISKE, OF NEWTON, MASSACHUSETTS.

BRICK.

SPECIFICATION forming part of Letters Patent No. 415,774, dated November 26, 1889.

Application filed September 11, 1889. Serial No. 323,659. (No model.)

*To all whom it may concern:*

Be it known that I, GEORGE M. FISKE, of Newton, in the county of Middlesex and State of Massachusetts, have invented a new and useful Improvement in Bricks, of which the following is a specification.

This invention relates to bricks for building purposes; and it consists in producing a brick whose face, while being perfectly finished and possessing the "skin" produced by pressure in molding, has the general appearance of "tooled" stone, as below described, and illustrated in accompanying drawings, in which—

Figure 1:
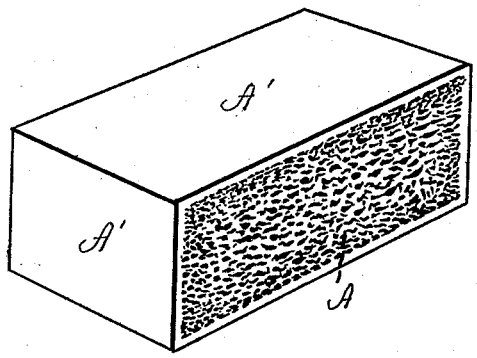
Figure 2:
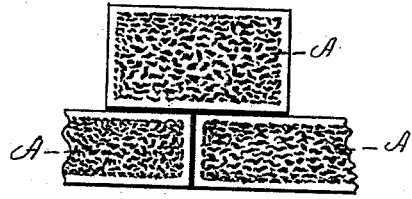

Figure 1 is a perspective view of a brick embodying my invention. Fig. 2 is an elevation showing portions of bricks embodying my invention in position in a brick wall.

A represents the faces of the bricks, formed in imitation of what is known as "tooled" stone, the other surfaces A' of the bricks being plain, as usual. These bricks are formed, while the clay is soft, in a mold or die, in which is placed a plate or surface which is the reverse or intaglio of the tooled surface of stone. This plate or surface is formed by spreading plaster, wax, or other suitable impressionable substance upon the tooled surface of a block of stone, or other substance which can be tooled in imitation of stone, and is when set or hardened inserted in the mold or die, or is used as a pattern to make a similar plate or surface from in some other material. The impression thus made upon the clay when the bricks are pressed into the mold or die is such that the face of the brick resembles a tooled surface of stone. After the bricks are completed they can be used in building walls, &c., as shown in Fig. 2, with very pleasing effect. The sizes most used vary from two by two inches on the face to twelve by eighteen inches.

I am aware that bricks have been produced in pairs and afterward split or fractured, thereby presenting a rough surface. In my invention a rough surface produced solely by actual splitting, fracturing, or tooling is what is desired to be avoided, as such a surface has no skin finish, and is consequently pervious to moisture, while the surface of my brick has a perfect skin, as it is a molded pressed surface, presenting the appearance only of a tooled surface.

Having thus fully described my invention, what I claim, and desire to secure by Letters Patent, is—

As a new and improved article of manufacture, a brick for building purposes provided with a molded pressed surface or face, as A, resembling and in imitation of tooled stone, said face being by means of said molding and pressure provided with a skin surface, whereby it is rendered practically impervious to moisture, substantially as set forth.

GEORGE M. FISKE.

Witnesses:
HENRY W. WILLIAMS,
J. M. HARTNETT.